United States Patent
Crane et al.

(10) Patent No.: US 6,435,765 B1
(45) Date of Patent: Aug. 20, 2002

(54) ATHLETIC TRACK WITH POST-TENSIONED CONCRETE SLAB

(76) Inventors: Brad L. Crane, 6307 Kimisu, Richmond, TX (US) 77469; Robin Melton, 3015 Saddlebrook La. South, Katy, TX (US) 77494

(*) Notice: Subject to any disclaimer, the term of this patent is extended or adjusted under 35 U.S.C. 154(b) by 0 days.

(21) Appl. No.: 09/613,301

(22) Filed: Jul. 10, 2000

(51) Int. Cl.[7] .............................. E01C 5/08; E01C 5/18; E01C 3/00
(52) U.S. Cl. ............................ 404/31; 404/17; 404/32; 404/47; 404/70
(58) Field of Search ............................ 404/17, 18, 31, 404/32, 47, 70; 52/173.1, 177, 223.6, 561

(56) References Cited

U.S. PATENT DOCUMENTS

| | | | | |
|---|---|---|---|---|
| 3,795,949 A | * | 3/1974 | Shorter | 24/115 R |
| 3,801,421 A | * | 4/1974 | Allen et al. | 161/67 |
| 3,986,342 A | | 10/1976 | MacCracken | |
| 4,073,753 A | * | 2/1978 | Hauge | 260/2.3 |
| 4,082,888 A | * | 4/1978 | Portin | 428/327 |
| 4,191,490 A | * | 3/1980 | Barnett | 404/70 |
| 4,307,879 A | | 12/1981 | McMahon et al. | |
| 4,420,513 A | * | 12/1983 | Coke et al. | 427/407.1 |
| 4,653,956 A | * | 3/1987 | Lang | 404/28 |
| 4,841,704 A | | 6/1989 | Jarrell | |
| 4,998,717 A | * | 3/1991 | Vaux | 272/3 |
| 5,182,137 A | * | 1/1993 | Allen | 427/138 |
| 5,199,815 A | * | 4/1993 | Inoue et al. | 404/18 |
| 5,271,199 A | | 12/1993 | Northern | |
| 5,347,777 A | | 9/1994 | Sudduth | |
| 5,414,972 A | | 5/1995 | Ruiz et al. | |
| 5,540,030 A | * | 7/1996 | Morrow | 52/742.13 |
| 5,830,378 A | | 11/1998 | Butler | |
| 5,875,595 A | * | 3/1999 | Smith | 52/223.6 |
| 5,897,102 A | | 4/1999 | Sorkin | |
| 5,939,003 A | | 8/1999 | Crigler et al. | |
| 5,961,389 A | | 10/1999 | Dickinson | |
| 6,071,039 A | * | 6/2000 | Ogura et al. | 404/32 |

* cited by examiner

*Primary Examiner*—H. Shackelford
*Assistant Examiner*—Gary S. Hartmann
(74) *Attorney, Agent, or Firm*—John R. Merkling

(57) ABSTRACT

An athletic track having a post-tensioned concrete slab supporting a resilient surface. The athletic track has opposed, parallel rectangular side areas and opposed semi-circular end areas connecting the side areas. The concrete slab is cast in place without requiring expansion joints between segments. Cables are cast into the slab for providing a tension load in the concrete slab. A first set of cables is tilted away from the perpendicular in a first direction while a second set of cables is parallel to the edges of the rectangular areas such that members of the second set of cables cross members of the first set of cables. A third set of circumferential cables is provided in the semi-circular end areas. A fourth set of cables intersecting the circumferential cables is non-radially disposed. The slab has a relatively flat lower surface. Pour strips situated along a line of symmetry are provided between adjacent quadrants of the end areas.

39 Claims, 3 Drawing Sheets

ATHLETIC TRACK WITH POST-TENSIONED CONCRETE SLAB

FIELD OF THE INVENTION

The invention relates to athletic playing surfaces and more particularly to an athletic track having a post-tensioned concrete foundation.

BACKGROUND OF THE INVENTION

Track and field sport competitions are frequently held on athletic tracks. Such tracks usually have a standard shape with opposed straight sides connected by semi-circular ends. A foundation usually supports an athletic surface. The track should be durable yet resilient to aid athletic performance and minimize injury. Originally, cinder tracks and other loose aggregate surfaces were used. More recently composite surfaces have been employed. Composite surfaces have a foundation, often poured-in-place concrete, and an athletic surface, often a resilient composite such as asphalt, a polymeric substance, or a mixture of materials. In any case, it is important that the track not develop cracks which could cause injuries. The track should also have a configuration which sheds water easily, particularly if the track is outdoors.

The development of cracks in concrete foundations is a well-known phenomenon. Ground-supported, reinforced concrete slabs, commonly referred to as "floating slabs", began to be used in residential and commercial construction after about 1945. Although floating slabs worked very well in many cases, they developed unacceptable cracks when used on "expansive" soils. Expansive soils absorb water and swell during rainy conditions, but shrink and dry during hot, dry weather. The combination of absorbent soils and a climate characterized by extended dry periods interspersed with significant rain can be found in many parts of the United States and particularly in California, Texas and Louisiana. During the mid 1960's, post-tensioned concrete slab foundations began to be used to support residential buildings in parts of Louisiana, Texas and California. Such slabs are called "post-tensioned" because they are stressed in tension after the concrete has set. A post-tensioned concrete slab comprises a poured-in-place concrete slab with metal strands or cables imbedded in the slab. The cables protrude from opposed parallel edges of the slab. Generally, there are two sets of parallel cables at right angles to each other, allowing the slab to be stressed in orthogonal directions. After the concrete has been poured and has set, the cables are pulled to a preselected tension, putting the slab under a compressive load. Concrete is very strong in compression, but weak in tension. A permanent compressive load on the concrete helps the slab resist cracking as the supporting ground swells and shrinks with changing water conditions.

Cracking occurs as the moisture content of the soil beneath a foundation changes differentially across the foundation. For example, the slab may be distorted in either a center lift mode (also termed "edge drying," "center heave", or "doming") or an edge lift mode (also, "edge swell", "edge heave" or "dishing"). Center lift mode is a long-term condition which occurs when the moisture content of the soil around the slab edges decreases and the soil sinks relative to the soil beneath the center of the slab. Edge lift mode is usually a seasonal, short-term condition which occurs when the ground at the edge of the slab becomes wetter than the ground beneath the center of the slab. The distance measured inward from the edge of a slab over which the moisture content varies is known as the "edge moisture variation distance" or "edge penetration distance". The edge penetration distance is generally a function of climate. Wetter climates create larger edge penetration distances, and potentially greater bending in either center lift or edge lift modes.

Athletic tracks with concrete foundations are subject to the same kinds of changes experienced by residential or commercial foundations. Moreover, the extended shape of the track may present additional problems because a track is relatively long and narrow. The curved ends also present peculiar problems for stressing a concrete slab.

There remains a need, therefore, for an athletic track having a post-tensioned concrete slab foundation. An object of the present invention is to provide such an athletic track.

SUMMARY OF THE INVENTION

The present invention comprises an athletic track having a post-tensioned concrete slab supporting a resilient surface. The athletic track has opposed, parallel rectangular side areas and opposed semi-circular end areas connecting the side areas. The concrete slab is cast in place without requiring expansion joints between segments. Cables are cast into the slab for providing a tension load in the concrete slab. The cables are not perpendicular to exposed sides of the rectangular side areas. A first set of cables is tilted away from the perpendicular in a first direction while a second set of cables is parallel to the edges of the rectangular areas such that members of the second set of cables cross members of the first set of cables. In another aspect of the invention, a third set of circumferential cables is provided in the semi-circular end areas. A fourth set of cables intersects the circumferential cables. The fourth set of cables is preferably non-radially disposed in the semi-circular end area. In another aspect of the invention, the slabs forming the track have a relatively flat lower surface, without downwardly extending footings. In a further aspect of the invention, pour strips are provided between adjacent quadrants of the end areas. In another aspect, the pour strips are situated along a line of symmetry.

It is an object of the invention, therefore, to provide an athletic track with a substrate of post-tensioned concrete.

It is a further object of the invention to provide an athletic track with a concrete substrate without features extending from a bottom surface thereof for use on expansive soils.

It is another object of the invention to provide an athletic track with a concrete substrate with increased longitudinal compression.

It is also an object of the invention to provide pour strips for a post-tensioned athletic track wherein the stresses on the pour strips are reduced.

Another important object is to provide a stable substrate for an athletic track to increase the longevity of a resilient surface on the substrate.

Yet another object of the invention is to provide a method of constructing an athletic track having a post-tensioned concrete substrate.

These and other features and objects of the invention will be apparent from the following detailed description, in conjunction with the accompanying drawings.

DETAILED DESCRIPTION

Figure 1:
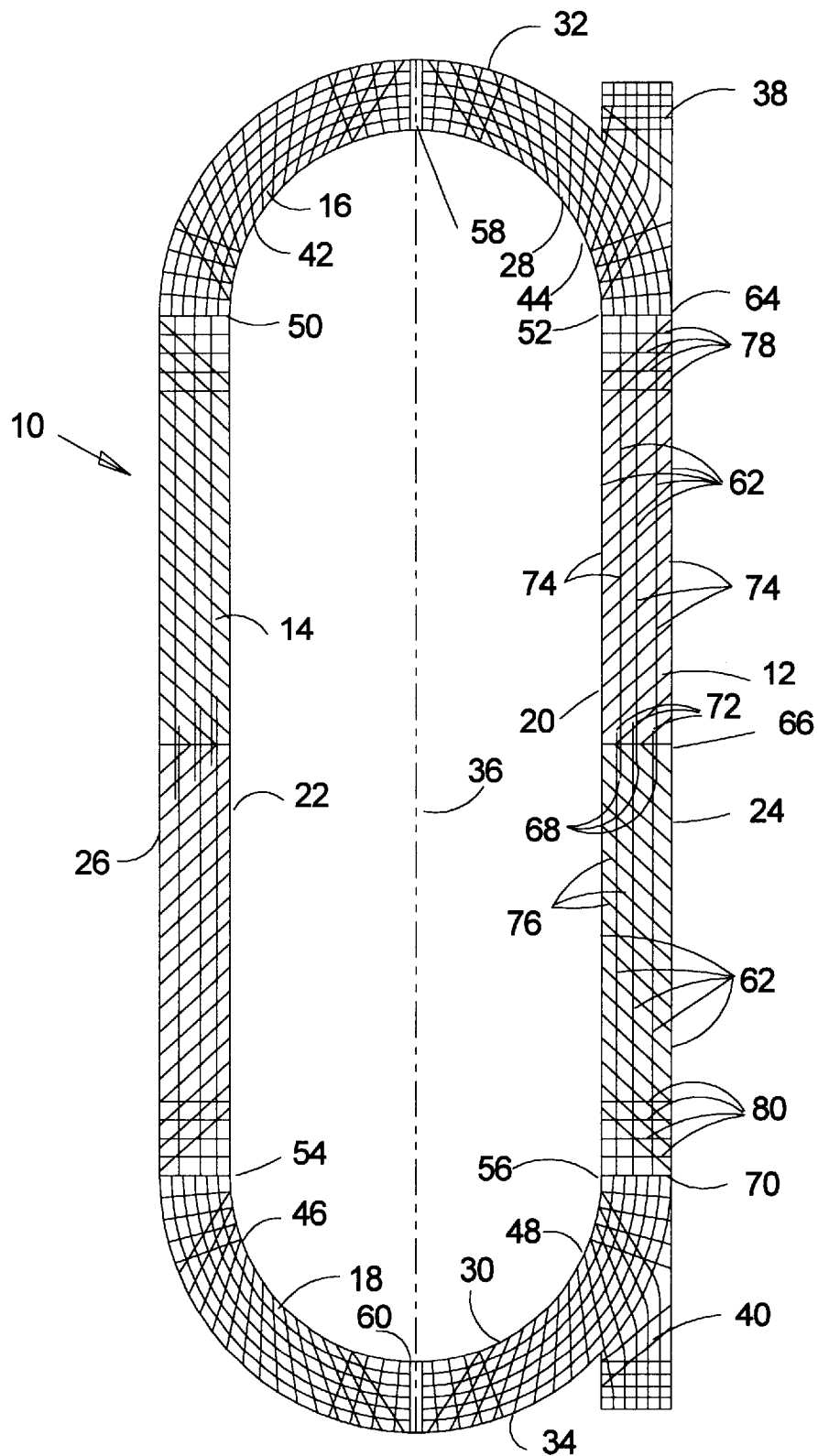
FIG. 1 is a top plan view of an athletic track, with embedded cables shown in solid lines.

A preferred embodiment of the invention will now be described with reference to the accompanying drawings. Like numerals will be used to identify like parts in all the drawings. FIG. 1 illustrates an athletic track 10 comprising two opposed generally rectangular side areas 12, 14 and two opposed generally semi-circular end areas 16, 18. Generally semi-circular should be understood to mean any smooth curve or arch or combination of arches and straight segments which would permit a runner or other athlete using the athletic track to make a circuit around the track. A true semi-circular configuration is preferred, but a segment of an ellipse or other such curve could also be used. Each rectangular area has an inner edge 20, 22 and an outer edge 24, 26. Each semi-circular end area has a curved inner edge 28, 30 and a curved outer edge 32, 34. The curved inner and outer edges conform to the shape chosen for the end areas. If the end areas are constructed in the shape of a smooth curve or arch or a combination of segments, the curved edges would usually conform thereto. Preferably, the rectangular areas 12, 14 and the semi-circular end areas are symmetrical about a line 36 bifurcating each of the end areas.

Extensions 38, 40 may be provided, co-linear with one of the rectangular side areas 12, for sprints and similar races and activities.

It is desirable that the athletic track 10 comprise as few separate concrete segments as possible. In the preferred embodiment, the rectangular areas are poured first, with encapsulated cables and reinforcing structures to be described below. The semi-circular end areas are then poured, each end area comprising two symmetrical quadrants 42, 44, 46, 48. Each quadrant joins its adjacent rectangular area at a cold joint 50, 52, 54, 56. A key way may be cast in the end of a rectangular area so that a mating key will be formed at an adjacent end of a quadrant as the concrete for the quadrant is poured. Adjacent quadrants 42, 44 and 46, 48 forming end areas 16, 18 are separated by a pour strip 58, 60. The pour strips 58, 60 are filled after tensioning of cables in the quadrants. Preferably, the pour strips lie on the line of symmetry 36. Because the athletic track is generally symmetrical around the line 36, strains caused by thermal expansion or contraction of the track or by expansion or contraction of the soil are minimized at the line of symmetry 36. Since the pour strips are relatively weaker structures, placement of the pour strips at the line of symmetry 36 reduces the probability of failure of these structures. The extensions 38, 40 may be poured at the same time that the quadrant 44, 48 to which they are attached is poured. The concrete may be vibrated as the segments of the athletic track are poured which reduces voids in the concrete and thereby increases the strength of the concrete when set. This process requires pouring in a fixed width equal to the operating width of the concrete pouring machine. In such circumstances, a quadrant should be poured and the extension poured thereafter.

Figure 2:
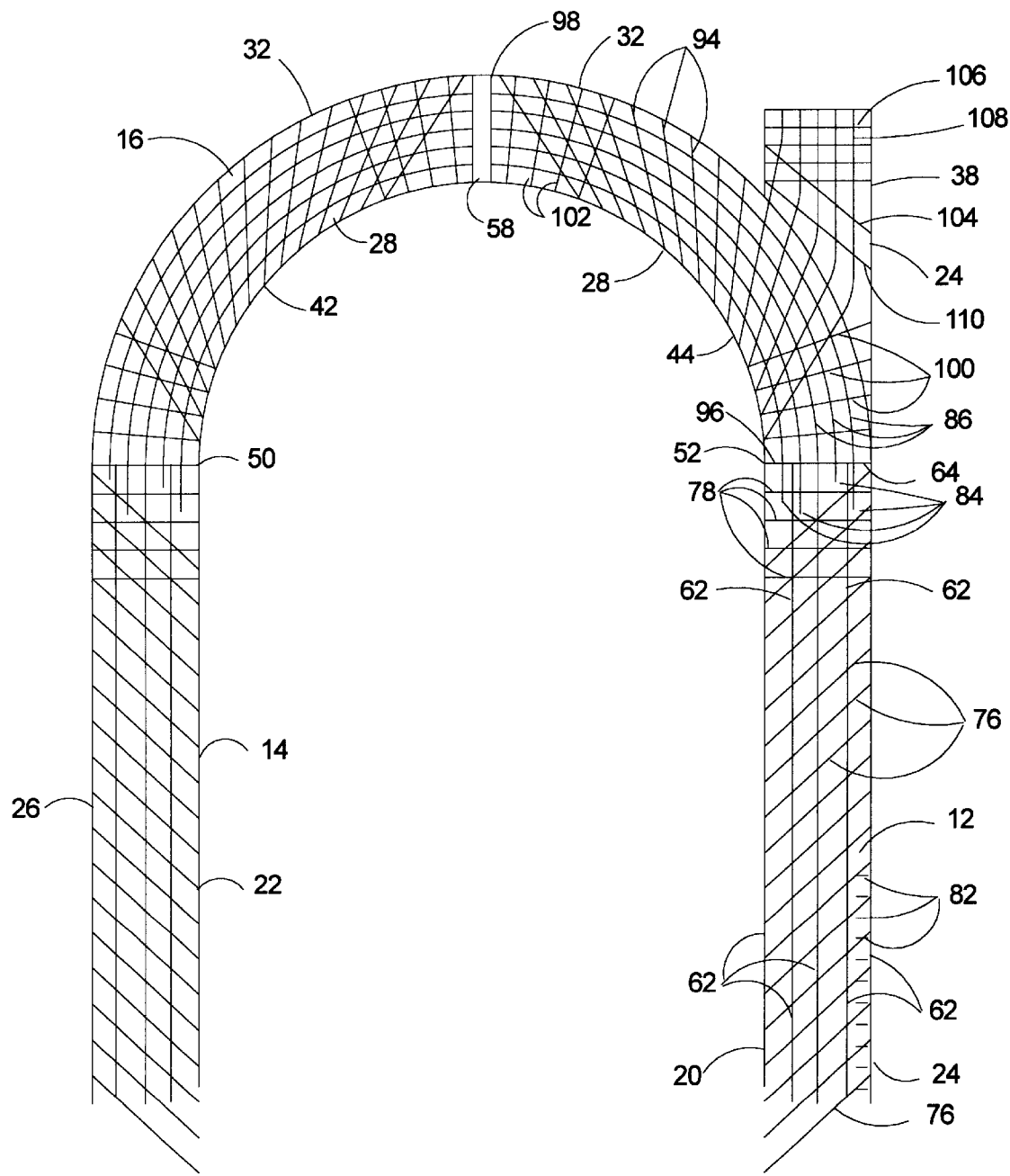
FIG. 2 is a top plan view of one half of the athletic track of FIG. 1.

Referring now to FIG. 2, a rectangular area, such as rectangular area 12, is prepared by laying a set of longitudinal cables 62 parallel to the inner and outer sides 20, 24 of the rectangular area 12. The longitudinal cables 62 extend from an end 64 of the rectangular area 12 where the cold joint 52 will be formed, past a midline 66, to selected locations 68 (see FIG. 1) in the rectangular area. Longitudinal cables 62 also extend from a second end 70 where the cold joint 56 will be formed, past the midline 66 to selected locations 72 in the rectangular area. Ends of the cables at the selected locations 72 are staggered such that adjacent cables do not end on a common line perpendicular to the edges 20, 24. Conventional anchors (not shown) secure ends of the longitudinal cables at the selected locations 68, 74 within the concrete of the rectangular area when it is poured and set. The longitudinal cables, as well as other tensioning cables described hereafter, are sheathed to allow the cables to be pulled into tension after the concrete has set.

A set of transverse cables 76 extends from the inner edge 20 to the outer edge 24. The transverse cables 76 are preferably parallel to each other and form an acute angle (and complimentary obtuse angle) at a cable's intersection with an edge. The acute angle may be 45°, but any suitable angle may be selected. This angled orientation of the transverse cables makes the transverse cables longer than they would be if they were only perpendicular to the edges 20, 24. Longer cables can stretch further in response to a load. Moreover, angled transverse cables resist crack formation perpendicular to the edges 20, 24 where cracking is most likely and which would otherwise be resisted only by the very long and relatively few longitudinal cables 62. The transverse cables 76 should cross the longitudinal cables 62 such that no path can be found from inner edge 20 to outer edge 24 or from end 64 to end 70 which does not cross a cable.

In addition, near the ends 64, 70, sets of perpendicular cables 78, 80 extend from edge to edge in an area where angled transverse cables cannot extend fully from edge to edge.

To further strengthen the outer edge 24, tendons 82 may be provided at regular intervals along the edge. For clarity, only a few representative tendons 82 are illustrated in FIG. 2. Tendons may be provided along the entire outside edge 24. Tendons comprise a length of re-enforcing rod (rebar), bent into a "J" shape, and imbedded in the concrete such that the long part is parallel to and adjacent the upper surface of the slab.

At the ends 64, 70 of the rectangular area 12, ends 84 of a set of circumferential cables 86 for a quadrant of a semi-circular end area are anchored with conventional anchors (not shown). The ends 84 of the circumferential cables 86 are also off set to distribute the load experienced by the concrete slab when the cables are tensioned.

Figure 3:
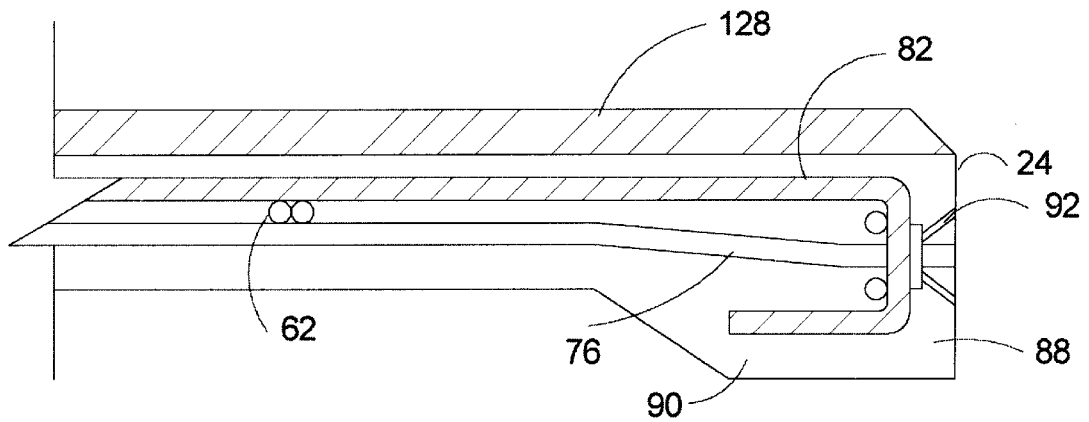
FIG. 3 is a partial sectional view of an edge of the athletic track.

With cables 62, 76, 78, and 86 and tendons 82 positioned, a concrete slab 88 is poured in the rectangular area 12. Preferably, the slab 88 is of uniform thickness. As illustrated in FIG. 3, the slab 88 may have a thickened area 90 along the outer edge 24 and the inner edge 22. This additional thickness spreads the stresses caused by tensioning a transverse cable 62 or perpendicular cable 78 with a conventional tensioning block 92 available from Suncoast Post-Tension of Houston, Texas, for example. Similar thickened areas may be provided at the ends 64, 70 for tensioning of the longitudinal cables 62. There are no footings as such extending transversely down from the slab. The athletic track 10 supports only the nominal loads of athletes using the surface. The track 10 essentially floats on the top of the soil. Particularly where that soil is expansive, footings would only provide surfaces against which expanding or contracting soil would push in horizontal directions, which would tend to crack the slab 88. Such features should be minimized or avoided.

Both rectangular areas 12, 14 may be constructed and poured at the same time. The rectangular areas 12, 14 should then be allowed to cure until the cables can be tensioned. In particular, tensioning blocks for the longitudinal cables 62 are concealed by the semi-circular end areas and are inaccessible after those areas have been poured.

After the rectangular areas have been poured, the quadrants of the semi-circular end areas are prepared for pouring. As the quadrants are similar, a description of one quadrant will be given. As mentioned above, circumferential cables 86 already have ends 84 imbedded in the rectangular areas. The circumferential cables are positioned concentrically from the end of the rectangular area 12 to the location where the pour strip 58 will be constructed. A set of fanned cables 94 extend from the curved inner edge 28 to the curved outer edge 32. The cables in the set of fanned cables do not lie on radii, but form an acute angle (and complementary oblique angle) with a tangent to either the curved inner edge or the curved outer edge at the intersection of a cable with an edge. Adjacent cables are slightly closer together at the curved inner edge than at the curved outer edge, but two intersections on the curved inner edge subtend the same degrees of arc as the two intersections of the same cables at the curved outer edge. As with the transverse cables 62, slanting the fanned cables 94 allows the cables to be longer and imparts a component of tension in a circumferential direction, which would otherwise have to be provided solely by the circumferential cables 86. The fanned cables 94 should cross the circumferential cables 86 such that no path can be found from the curved inner edge 28 to the curved outer edge 32 or from a first end 96 to a second end 98 which does not cross a cable. In addition, near the ends 96, 98, sets of radial cables 100, 102 extend from curved edge to curved edge in an area where fanned transverse cables cannot extend fully from edge to edge.

If an extension 38 is attached to a quadrant, the fanned cables 94 are extended into the extension. Some 104 of the fanned cables are curved until they lie parallel to the outer edge 24. This outer edge 24 is common to both the extension 38 and the adjacent rectangular area 12. The curved, fanned cables 104 terminate at conventional tension blocks at an end of 106 of the extension 38. Perpendicular cables 108 cross the extension 38 perpendicular to the outer edge 24. Transverse cables 110 cross the extension 38 in the area where area where the curved, fanned cables 104 bend and form acute (and complimentary oblique) angles at their intersection with the outer edge 24.

Where all the aforementioned cables are exposed at edges or ends of rectangular areas, quadrants of semi-circular end areas, or extensions, conventional tension blocks are provided so that the cables may be placed under tension when a surrounding slab of concrete has been applied and has set to a sufficient hardness.

Figure 4:
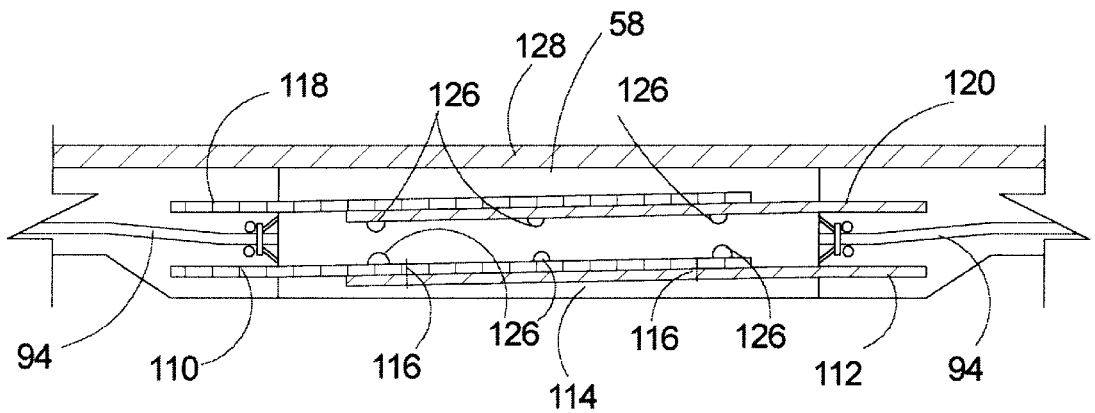
FIG. 4 is a partial sectional view of a pour strip from the athletic track.

The two quadrants of a semi-circular end area meet at the pour joint 58, illustrated in cross section in FIG. 4. Lower reinforcing rods 110, 112 are placed across a gap 114 and extending into areas which will be the ends of concrete slabs forming the quadrants. The lower rods are fastened together with wire ties 116 such that a rod extending from one quadrant is fastened to a rod extending from an adjacent quadrant. A second series of upper reinforcing rods 118, 120 is placed above the tension blocks attached to ends of the circular cables 94. Free ends of these upper rods 118, 120 are not fastened together at once but are bent upward, making it easier to reach the cables 94. Slabs of concrete for the quadrants and extensions 38, if any, are poured, encasing cables and ends of the rods 110, 112, 118, 120. The same considerations for the shape of the slabs apply to the quadrants and extensions as explained above in connection with the rectangular areas. When the slabs have set, the cables in the quadrants and extensions are tensioned. Free ends of the upper rods can then be bent down and rods from adjacent quadrants can be fastened together with wire ties. Transverse rods 126 perpendicular to the upper or lower rods may also be tied to the upper and lower rods. The gap between the ends of the adjacent quadrants is then filled with concrete, forming the pour strip 58.

After all the concrete has been poured, set and tensioned, a resilient athletic surface 128 is placed on the structure. Because the concrete slabs are tensioned, cracks sufficient to damage the athletic surface 128 are less likely to develop. Also, the relatively flat bottom of the track 10 enables the track to float on expansive soils so that forces which would otherwise contribute to cracking are reduced or eliminated. The resistance to cracking is enhanced by placing the pour strips on a line of symmetry, where the weaker pour strips are subjected to weaker forces.

These and other features and advantages of our invention, as well as modifications, will be apparent to the skilled artisan. The foregoing description is intended, therefore, to be illustrative only and the scope of the invention is to be defined by the following claims. All variations and changes which are within the scope of equivalency of the claims are intended to be encompassed therein.

What is claimed is:

1. An athletic track comprising
   a resilient surface, and
   a post-tensioned concrete slab supporting the resilient surface, the concrete slab having
      at least two opposed generally rectangular side areas, each side area having an inner edge and an outer edge, and
      at least two opposed generally semi-circular end areas connecting the side areas, each end area having a curved inner edge and a curved outer edge,
      a first set of spaced, substantially parallel cables in at least one of said rectangular side areas, and a second set of spaced, substantially parallel cables in said at least one of said rectangular side areas, at least some of said cables in said second set intersecting at least some of said cables in said first set, said second set of cables being non-perpendicular to said first set of cables.

2. The athletic rack of claim 1 wherein said cables of said first set of cables are substantially parallel to an edge of at least one rectangular area.

3. The athletic track of claim 2 wherein said cables of said second set of cables intersect said inner and outer edges of said rectangular area.

4. The athletic track of claim 3 further comprising a third set of spaced, substantially parallel cables in said rectangular area, said cables in said third set extending substantially perpendicular to an edge of said rectangular area.

5. The athletic track of claim 1 wherein said concrete slab has a uniform lower surface.

6. The athletic track of claim 5 wherein said concrete slab is thicker adjacent said inner and outer edges of said side areas than between said inner and outer edges and thicker adjacent said curved inner edges and said curved outer edges of said end areas than between said curved inner edges and said curved outer edges.

7. The athletic track of claim 5 wherein said lower surface has substantially no footings protruding therefrom.

8. The athletic track of claim 1 wherein said concrete slab comprises a plurality of segments, each segment joined to an adjacent segment by a cold joint or a pour strip.

9. The athletic track of claim 8 wherein none of the segments are joined by an expansion joint.

10. The athletic track of claim 8 further comprising at least one pour strip in each of said semi-circular end areas.

11. The athletic track of claim 10 wherein said rectangular areas and said semi-circular end areas are substantially symmetrical about a line bifurcating each of said end areas, and said pour strips are symmetrical about said line.

12. The athletic track of claim 11 wherein said pour strips lie on said line.

13. An athletic track comprising
a resilient surface, and
a post-tensioned concrete slab supporting the resilient surface, the concrete slab having
a uniform lower surface with substantially no footings protruding therefrom,
at least two opposed generally rectangular side areas, each side area having
an inner edge and an outer edge,
a first set of spaced apart cables substantially parallel to said inner and outer edges of said rectangular areas, and
a second set of spaced apart, substantially parallel cables, cables of said second set of cables intersecting cables of said second set of cables at a non-perpendicular angle and
at least two opposed generally semi-circular end areas connecting the side areas, each end area having a curved inner edge and a curved outer edge, each of said semi-circular end area comprising at least two arched segments, said segments being symmetrical about a line separating said segments and having a pour strip connecting said segments at said line.

14. The athletic track of claim 13 wherein each arched segment has a third set of cables, said cables in said third set for each arched segment being spaced apart from each of the other cables in said third set for said arched segment and intersecting said curved inner edge and said curved outer edge in said segment in a non-radial manner.

15. The athletic track of claim 14 wherein said arched segments have adjacent ends and wherein each cable of said third set of cables for a segment intersects said outer curved edge of said segment closer to said adjacent end of said segment than said each cable intersects said inner curved edge of said segment.

16. The athletic track of claim 15 further comprising a fourth set of cables in each of said arched segments of said semi-circular end area of said concrete slab, said cables in said fourth set being spaced apart from each other and forming substantially concentric arcs and at least some of said cables in said fourth set intersecting at least some of said cables in said third set.

17. The athletic track of claim 13 wherein said concrete slab is thicker adjacent said inner and outer edges of said side areas than between said inner and outer edges and thicker adjacent said curved inner edges and said curved outer edges of said end areas than between said curved inner edges and said curved outer edges.

18. The athletic track of claim 13 wherein said concrete slab comprises a plurality of segments, each segment joined to an adjacent segment by a cold joint or a pour strip.

19. The athletic track of claim 18 wherein none of the segments are joined by an expansion joint.

20. An athletic track comprising
a resilient surface, and
a post-tensioned concrete slab supporting the resilient surface, the concrete slab having
at least two opposed generally rectangular side areas, each side area having an inner edge and an outer edge, and
at least two opposed generally semi-circular end areas connecting the side areas, each end area having a curved inner edge and a curved outer edge,
a first set of cables in at least one of said semi-circular end areas of said concrete slab, said cables in said first set being spaced apart from each of the other cables in said first set and intersecting said curved inner edge and said curved outer edge in a non-radial manner.

21. The athletic track of claim 20 wherein said concrete slab comprises a plurality of segments, each segment joined to an adjacent segment by a cold joint or a pour strip.

22. The athletic track of claim 21 further comprising at least one pour strip in each of said semi-circular end areas.

23. The athletic track of claim 22 wherein said rectangular areas and said semi-circular end areas are substantially symmetrical about a line bifurcating each of said end areas, and said pour strips are symmetrical about said line.

24. The athletic track of claim 23 wherein said pour strips lie on said line.

25. The athletic track of claim 21 wherein none of the segments are joined by an expansion joint.

26. The athletic track of claim 20 wherein said semi-circular end area comprises at least two arched segments, said segments having a pour strip connecting said segments.

27. The athletic track of claim 26 wherein said pour strip is substantially equidistant between said rectangular side areas.

28. The athletic track of claim 27 wherein said semi-circular end area comprises at least two arched segments, each segment having a third set cables, said cables in said third set for each selected segment being spaced apart from each of the other cables of said third set for said selected segment and intersecting said curved inner edge and said curved outer edge in said segment in a non-radial manner.

29. The athletic track of claim 28 wherein said arched segments have adjacent ends and wherein each cable of said third set of cables for a segment intersects said outer curved edge of said segment closer to said adjacent end of said segment than said each cable intersects said inner curved edge of said segment.

30. The athletic track of claim 29 further comprising a fourth set of cables in each of said arched segments of said semi-circular end area of said concrete slab, said cables in said fourth set being spaced apart from each of the other cables of said fourth set and forming substantially concentric arcs and at least some of said cables in said second set intersecting at least some of said cables in said third set.

31. The athletic track of claim 30 wherein said fourth sets of cables have static ends, said static ends being connected to a rectangular side area adjacent said arched segment.

32. The athletic track of claim 30 further comprising a fifth set of cables in each of said arched segments of said semi-circular end area, said cables of said fifth set being spaced apart from each of the other cables of said fifth set and extending substantially radially from said inner curved edge to said outer curved edge.

33. The athletic track of claim 20 further comprising a second set of cables in said semi-circular end area of said concrete slab, said cables in said second set being spaced apart from each of the other cables in said second set forming substantially concentric arcs and at least some of said cables in said second set intersecting at least some of said cables in said first set.

34. The athletic track according to claim 33 wherein at least one of said semi-circular end areas further comprises an extension having an outer edge substantially co-linear with the outer edge of one of the rectangular side areas and inner edge substantially co-linear with the inner edge of said one of said rectangular side areas, and an end connecting said inner and outer edges of said extension, said extension having a fifth set of extension cables said cables in said fifth set being spaced apart from each of the other cables in said fifth set and extending from said end to the curved inner edge of the semi-circular end area.

35. The athletic track of claim 34 wherein said extension further comprises a sixth set of extension cables said cables in said sixth set being spaced apart from each of the other cables in said sixth set and extending from said inner edge of said extension to said outer edge of said extension.

36. The athletic track of claim 33 further comprising a third set of cables in said semi-circular end area, said cables of said third set being spaced apart from other cables of said third set and extending substantially radially from said inner curved edge to said outer curved edge.

37. The athletic track of claim 20 wherein said concrete slab has a uniform lower surface.

38. The athletic track of claim 37 wherein said concrete slab is thicker adjacent said inner and outer edges of said rectangular side areas than between said inner and outer edges of said rectangular side areas and thicker adjacent said curved inner edges and said curved outer edges of said semi-circular end areas than between said curved inner edges and said curved outer edges.

39. The athletic track of claim 37 wherein said lower surface has substantially no footings protruding therefrom.

* * * * *